US007250697B2

(12) United States Patent
Beaulieu (10) Patent No.: US 7,250,697 B2
(45) Date of Patent: Jul. 31, 2007

(54) LINEAR GENERATOR APPARATUS

(76) Inventor: Gérald Beaulieu, 13410 du Suroît, Mirabel (CA) J7J 1X6

( * ) Notice: Subject to any disclaimer, the term of this patent is extended or adjusted under 35 U.S.C. 154(b) by 261 days.

(21) Appl. No.: 11/010,375

(22) Filed: Dec. 14, 2004

(65) Prior Publication Data

US 2006/0125325 A1    Jun. 15, 2006

Related U.S. Application Data

(60) Provisional application No. 60/528,724, filed on Dec. 12, 2003.

(51) Int. Cl.
*H02K 41/00* (2006.01)
(52) U.S. Cl. .......................................... 310/12; 310/15
(58) Field of Classification Search ............. 310/12–15
See application file for complete search history.

(56) References Cited

U.S. PATENT DOCUMENTS 4,912,343 A * 3/1990 Stuart ........................... 310/14
5,347,186 A * 9/1994 Konotchick ................. 310/17
6,952,060 B2 * 10/2005 Goldner et al. .............. 310/12
2003/0034697 A1    2/2003 Goldner et al.

* cited by examiner

*Primary Examiner*—Thanh Lam
(74) *Attorney, Agent, or Firm*—Equinox; Franz Bonsang, patent agent (57) ABSTRACT

A linear generator apparatus includes first and second elongate coaxial bodies that are axially movable relative to one another with a reciprocating movement. The first body is axially and freely movable relative to the second body within a predetermined displacement range or free zone. A helical spring connecting to both first and second bodies biases the first body toward the free zone relative to the second body when outside of the free zone. An electrical power generator mounted on both first and second bodies generates power when the first and second bodies axially move relative to one another within the free zone and beyond. The invention also relates to a suspension system for motor vehicle that includes a coil spring and the apparatus in replacement of a conventional shock absorber.

43 Claims, 6 Drawing Sheets

LINEAR GENERATOR APPARATUS

CROSS-REFERENCE TO RELATED APPLICATION

The present application is related to U.S. Provisional Application for Patent Ser. No. 60/528,724 filed on Dec. 12, 2003.

FIELD OF THE INVENTION

The present invention relates to linear generator apparatuses, and is more particularly concerned with energy collected by a linear generator apparatus for mounting on a circulating vehicle in relation with the corresponding surface onto which the motor vehicle is in motion.

BACKGROUND OF THE INVENTION

It is well known in the art to use the energy of vehicles traveling, such as in braking for example. This is becoming more and more a necessity nowadays considering the increasing electrical consumption of today's vehicles for various electronic devices. Moreover, the also increasing demand of electrical or hybrid vehicles requires designers and engineers to come up with ways to have better and innovative ways of recuperating and storing the energy to be used in a limited space. Considering also that the number of batteries that can be used is limited, other ways of improving energy collecting apparatuses need to be developed and improved. The irregularities of road surfaces offer another source of energy for which efficiency results have been so far too limited for practical use. One should further be aware, as many studies in the art show, that a very high percentage of road irregularities is of amplitude ranging between about 1 mm and about 6 mm.

In the previous art, application for U.S. Patent No. 2003/0034697 of Goldner et al. published on Feb. 20, 2003, discloses an electromagnetic linear generator and shock absorber. That application and the numerous patents referred therein do not provide for a means to maximize or optimize the zone in which the central magnet array assembly operates. Furthermore, the systems presented do not seem to show other considerations such as ensuring the apparatus has a mechanical endurance that is viable over long-lasting mileage and includes a system to switch to an active suspension when the apparatus works outside the preferred operational zone. In Table 4 of the disclosed document, the smaller wire gauge presented is 18 (1 mm diameter or 1 mm×1 mm square cross section) whilst the air gap spacing is no greater than 0.020 inches (approximately 0.5 mm); one must therefore ensure the wire thickness fits along with the air gap suggested and consider the temperature range in which the apparatus operates. In another aspect of the invention the coil windings of this publication are shown positioned side-by-side.

Accordingly, there is a need for an improved apparatus with a relatively simple configuration.

SUMMARY OF THE INVENTION

It is therefore a general object of the present invention to provide an improved linear generator apparatus.

An advantage of the present invention is that the linear generator apparatus provides for a system optimizing the recuperation of energy, or means to generate electrical power, based on road irregularities ranging preferably between about 0 mm and about 10 mm or a variety of high frequencies systems.

Another advantage of the present invention is that the linear generator apparatus provides for a helical spring or biasing means with one end enabled to move within a predetermined displacement range, and an urging means or compressive spring pushing or forcing back the biasing means towards the predetermined displacement range when limits are reached.

A further advantage of the present invention is that the linear generator apparatus can be adapted to various types of traffic vehicles or other equipments with an averaging high frequency in a preferred predetermined zone or free zone, i.e. a zone free of any biasing force counteracting the axial component of an induced vibration.

Still another advantage of the present invention is that the linear generator apparatus can be adapted into various types of vehicle frames.

Another advantage of the present invention is that the linear generator apparatus can provide to vehicle motorists savings on gas consumption and brakes wear.

Another advantage of the present invention is that the linear generator apparatus provides for a means to detect operation of the urging means and simultaneously engage a standard active suspension system or the like A further advantage of the present invention is that the linear generator for vehicle is protected from outside elements by a partially resilient casing and includes a compensating chamber.

According to an aspect of the present invention, there is provided a linear generator apparatus, comprising: first and second elongate bodies generally coaxial relative to one another, said first and second bodies being generally axially movable relative to one another with a reciprocating movement, said first body being generally axially and freely movable relative to said second body within a predetermined displacement range; a means for biasing said first body toward said predetermined displacement range relative to said second body when outside of said predetermined displacement range, said biasing means connecting to both said first and second bodies; and a means for generating electrical power mounted on both said first and second bodies, said power generating means generating power when said first and second bodies axially move relative to one another at least within said predetermined displacement range.

In one embodiment, the predetermined displacement range is about one centimeter (0.4 inch).

In one embodiment, the biasing means has generally opposite first and second longitudinal ends, said first end being fixedly connected to said first body, said second end being releasably connected to said second body.

In one embodiment, the biasing means is a helical spring generally parallel to said first and second bodies, said helical spring has generally opposite first and second longitudinal ends, said first end being fixed to said first body, said second end being freely anchored to said second body.

Typically, the second end is free from said second body when said first body is within said predetermined displacement range and in abutment with said second body when said first body is outside from said predetermined displacement range.

Typically, the second end includes an arcuate rod extending generally outwardly and axially therefrom, said arcuate rod being generally parallel to and spaced apart from at least an end portion of a last thread of said second end.

Typically, the second end includes a plurality of axial rods, said axial rods connecting said arcuate rod to said at least an end portion of a last thread.

Typically, the second body includes at least one abutment protrusion extending generally radially outwardly therefrom, said at least one abutment protrusion being locatable between said arcuate rod and said at least an end portion of a last thread so as to be in selective abutment contact with one of said arcuate rod and said at least an end portion of a last thread when said when said first body is outside from said predetermined displacement range.

Typically, the second body includes a plurality of abutment protrusions extending generally radially outwardly therefrom, said plurality of abutment protrusions being circumferentially spaced apart form one another to freely receive a respective said plurality of axial rods therebetween.

In one embodiment, the at least one abutment protrusion form at least a portion of an annular ridge, said annular ridge having a plurality of axial bores extending therethrough, each of said plurality of axial rods freely axially engaging a respective said plurality of axial bores.

In one embodiment, the apparatus further includes a means for urging said first body away from said second body and toward said predetermined displacement range relative to said second body when said first body reaches a first displacement limit outside of said predetermined displacement range and when said first and second bodies are being displaced toward one another.

Typically, the urging means is a compressive spring mounted on said second body.

Typically, the apparatus further includes a means for detecting operation of said first body reaching a second displacement limit outside of said predetermined displacement range and beyond said first displacement unit, said detecting means being electrically connectable to a controller linked to an external electrical power source, said detecting means providing signal to the controller for allowing reverse operation of said power generating means into an electrical urging means during displacement of said first body beyond said second displacement limit so as to assist said urging means and said biasing means to displace said first and second bodies away from one another toward said predetermined displacement range.

Typically, the power generating means includes a magnet assembly mounted on said first body and a coil assembly mounted on said second body, said magnet assembly being operatively coupled to said coil assembly at least when said first body is within said predetermined displacement range relative to said second body.

Typically, the coil assembly has a generally cylindrical shape with a bore extending generally axially therethrough, at least a portion of said magnet assembly axially and slidably engaging said bore and defining a radial air gap therebetween with said coil assembly when said first body is within said predetermined displacement range relative to said second body.

Typically, the coil assembly defines first and second longitudinal ends thereof and includes a plurality of windings, each said windings extending generally axially between said first and second coil ends, each said windings having wire terminals coming out at one of said coil ends.

Typically, the plurality of windings are generally radially adjacent to one another in a radial superposition configuration.

In one embodiment, the plurality of windings are individually electrically connectable to the controller so as to allow the controller selectively electrically interconnect said plurality of windings in a series and/or parallel configuration depending on a condition of use of said apparatus.

In one embodiment, the at least a portion of said magnet assembly is a first section thereof, said first magnet section includes a plurality of magnets generally axially adjacent to one another.

Typically, each said magnets has axially opposed magnetic polarities, said plurality of magnets being arranged with an alternate magnetic configuration such that adjacent said magnets face one another with a same magnetic polarity.

Typically, each said plurality of magnets form a generally cylindrical magnetic component, said magnet assembly including a cylindrical magnet cover, said magnet cover generally radially covering said plurality of magnets and favoring a substantially radial orientation of a magnetic field of said first magnet section.

Typically, the first magnet section includes a plurality of spacers between adjacent said magnets so as to provide an alternating magnet-spacer configuration of said first magnet section, each said spacer substantially uniformly distributing a magnetic field between respective adjacent said magnets.

In one embodiment, the air gap is a first air gap and said magnet assembly includes a second section thereof, said second magnet section extending generally radially outwardly from said coil assembly to axially and slidably move relative thereto and define a second radial air gap therebetween with said coil assembly when said first body is within said predetermined displacement range relative to said second body.

Typically, the second magnet section includes a magnetically conductive component, said magnetically conductive component confining a magnetic field of said first magnet section in a close relationship relative to said coil assembly when said first body is within said predetermined displacement range relative to said second body so as to locally enhance propagation of the magnetic field and increase electrical power generated by said power generating means.

Typically, the second magnet section includes a shield extending radially outwardly relative to said magnetically conductive component, said shield extending axially at least over said coil assembly when said first body is within said predetermined displacement range relative to said second body so as to at least shield said power generating means from external electromagnetic disturbances.

In one embodiment, the apparatus further includes a means for guiding and allowing axial sliding of said first body relative to said second body at least when said first body is within said predetermined displacement range relative to said second body, said linear sliding and guiding means mounting at least on one of said first and second bodies.

Typically, the linear sliding and guiding means contactlessly guides axial sliding of said first body relative to said second body at least when said first body is within said predetermined displacement range relative to said second body.

Typically, the linear sliding and guiding means includes at least one first magnetic piece mounted on said first body and at least one second magnetic piece mounted on said second body, said first and second magnetic pieces generally radially facing one another in a magnetic repulsion configuration at least when said first body is within said predetermined displacement range relative to said second body.

Typically, the at least one first magnetic piece includes a plurality of elongate first magnetic bands and said at least one second magnetic piece includes a plurality of elongate second magnetic bands, each said first magnetic bands generally facing a respective one of said second magnetic bands at least when said first body is within said predetermined displacement range relative to said second body.

Typically, one of said first and second magnetic bands have a generally concave facing surface and the other one of said first and second magnetic bands have a generally convex facing surface.

Typically, the first magnetic bands are generally equally circumferentially spaced apart from one another and said second magnetic bands are generally equally circumferentially spaced apart from one another so as to allow each said first magnetic bands operatively coupling to a respective said second magnetic bands.

In one embodiment, the apparatus further includes a means for limiting axial displacement of said first and second bodies relative to one another, said displacement limiting means mounting on at least one of said first and second bodies.

Typically, the displacement limiting means first and second abutment surfaces of said first body and third and fourth abutment surfaces of said second body, said first and third abutment surfaces limiting axial displacement of said first body toward said second body when said apparatus is in a compression configuration, said second and fourth abutment surfaces limiting axial displacement of said first body away from said second body when said apparatus is in a tension configuration.

In one embodiment, the first and second bodies are axially spaced apart from one another by a variable space at a location substantially adjacent said biasing means, said apparatus further including a means for enclosing said variable space, said enclosing means connecting to both said first and second bodies and forming an enclosure of said variable space therewith.

Typically, the enclosing means includes a bellows so as to allow axial displacement of said first and second bodies relative to one another.

Typically, the first and second bodies define a chamber therebetween, said chamber being generally axially opposite from said enclosure relative to said power generating means, said chamber allowing for relative axial displacement of said first and second bodies.

Typically, the chamber is essentially fluidly isolated from said enclosure, said apparatus further including a generally flexible membrane at least partially defining said chamber so as to allow substantially radial expansion and contraction of a volume of said chamber caused by internal pressure variations therein due to relative axial displacement between said first and second bodies.

Typically, the membrane and bellows are sealably connected to said first and second bodies to form a fluidly closed room inside said apparatus, said first and second bodies including a plurality of pressure equilibrium bores extending therethrough to allow for at least partial pressure equilibrium between said chamber and said enclosure of said closed room.

In one embodiment, the enclosing means is sealably connected to said first and second bodies to form a fluidly closed room inside said apparatus, said closed room including said variable space, said first and second bodies including a plurality of pressure equilibrium bores extending therethrough to allow for at least partial pressure equilibrium within said closed room.

According to another aspect of the present invention, there is provided a suspension system for a motor vehicle, comprising: a coil spring connected to a body structure of the motor vehicle and to a wheel mounting structure pivotally mounted on the body structure; and a linear generator apparatus mounted on the motor vehicle between the body structure and the wheel mounting structure, said apparatus includes: first and second elongate bodies generally coaxial relative to one another, said first and second bodies being generally axially movable relative to one another with a reciprocating movement, said first body being generally axially and freely movable relative to said second body within a predetermined displacement range; a means for biasing said first body toward said predetermined displacement range relative to said second body when outside of said predetermined displacement range, said biasing means connecting to both said first and second bodies; and a means for generating electrical power mounted on both said first and second bodies, said power generating means generating power when said first and second bodies axially move relative to one another at least within said predetermined displacement range.

In one embodiment, the apparatus is mounted in parallel relative to said coil spring.

Typically, the first body is displaced substantially halfway within said predetermined displacement range relative to said second body when said suspension is in an equilibrium position.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
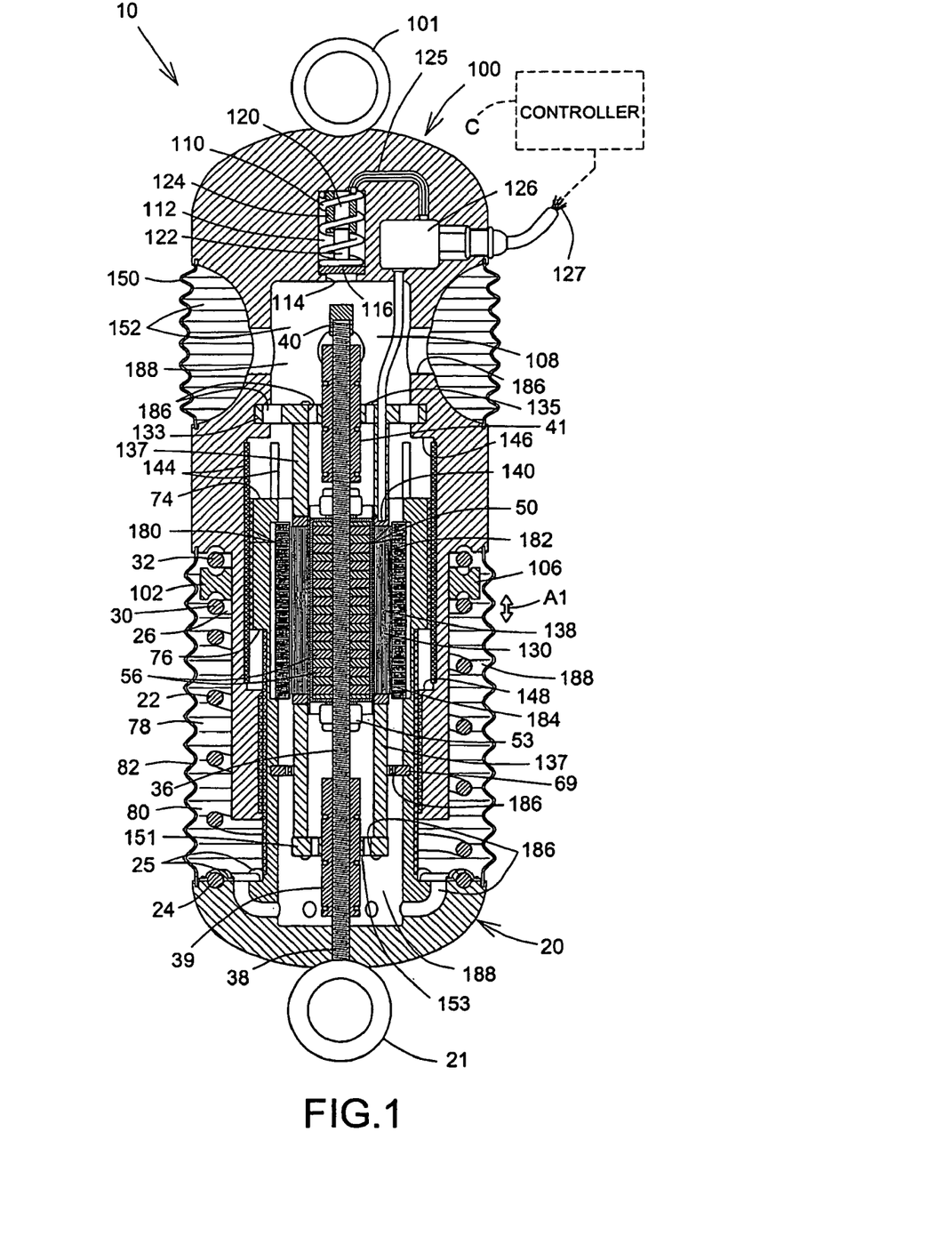
FIG. 1 is a cross-section view of a linear generator apparatus in accordance with an embodiment of the present invention.
Figure 1A:
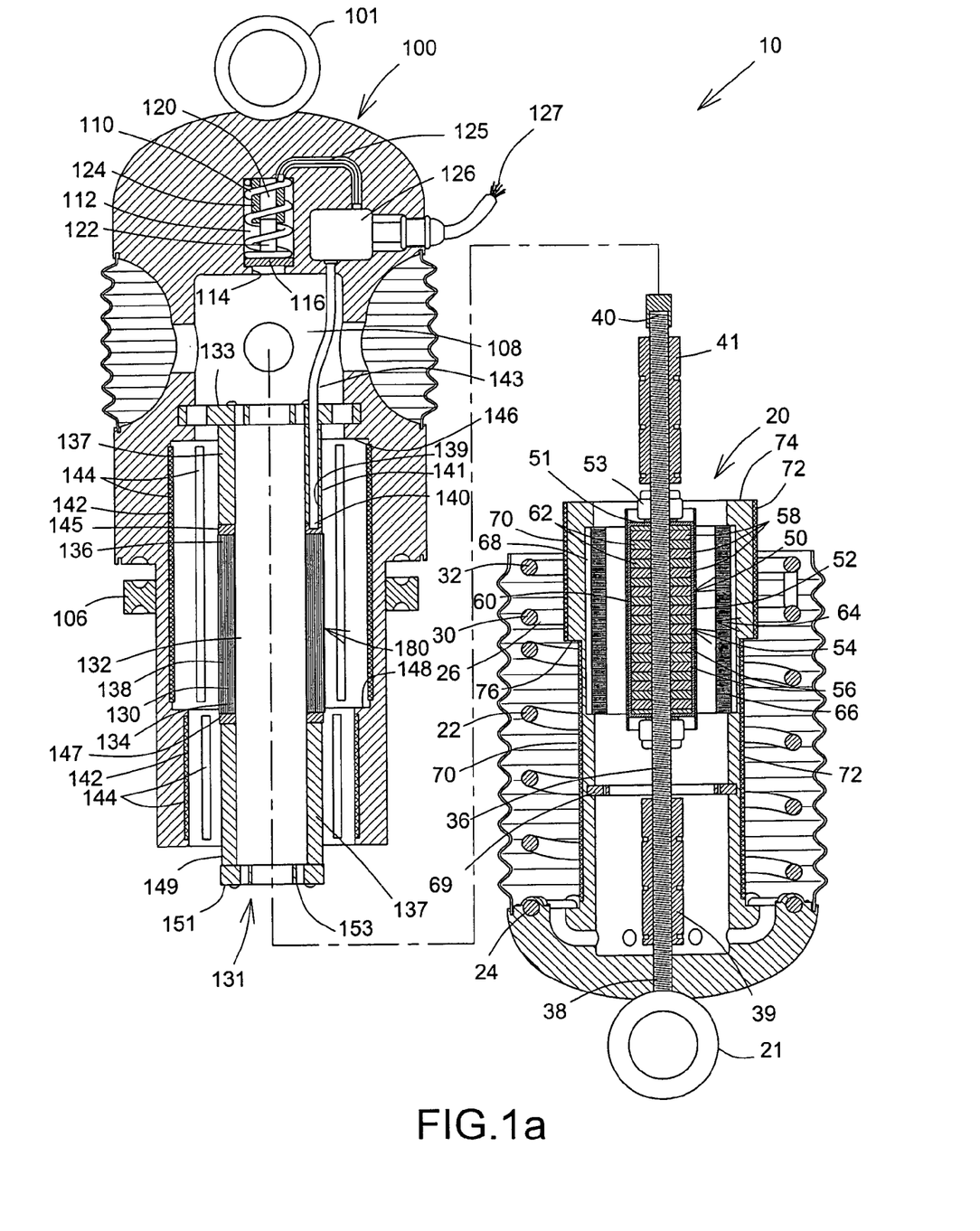
FIG. 1a is a cross-section view showing separately the first and second bodies of the embodiment of FIG. 1.

Referring to FIGS. 1 and 1a, there is shown a linear generator apparatus 10 in accordance with an embodiment of the present invention connectable to an electrical power accumulator, electrical load or the like (not shown). The apparatus 10 includes first and second elongated bodies 20 and 100. The first, and second bodies 20, 100, or magnet housing and coil housing respectively, are generally coaxial relative to one another and generally axially movable relative to one another with a reciprocating movement, as indicated by arrow A1. An annular ring 21 secured on the first body 20 is a means to secure the first body 20 to a part such as a vehicle chassis for example. Similarly, an annular ring 101 secured on the second body 20 is a means to secure the second body 100 to a part such as a vehicle wheel assembly for example. The generally axial and free movement of the first body 20 relative to the second body 100 is within a predetermined displacement range or free or unbiased zone range. The predetermined displacement range is expressed more comprehensively by FIGS. 3a through 4c.

Figure 2:
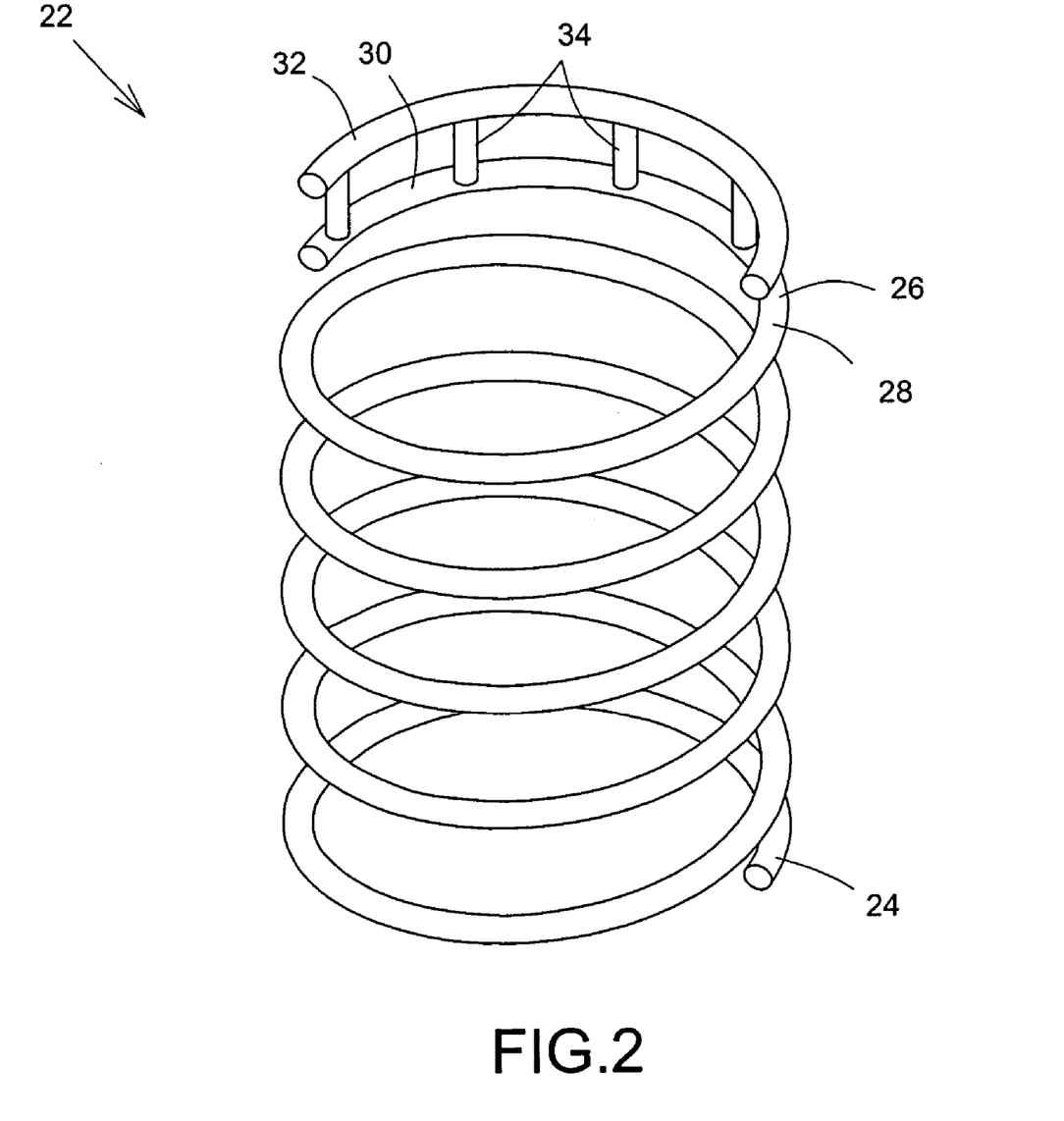
FIG. 2 is a perspective view of the biasing means of the embodiment of FIG. 1.

As illustrated also in FIG. 2, a biasing means 22 or preferably a helical return spring or the like is parallel to the first and second bodies 20, 100 and includes a first longitudinal end 24 thereof generally opposite a second longitudinal end 26 thereof. The first end 24 of the helical spring 22 is secured to the first body 20 by at least one and preferably a series of coupling parts 25. The helical spring 22 has a series of arcuate threads 28. The second end 26 of the helical spring 22 is partially formed by an end portion 30 of a last thread 28. Furthermore, the second end 26 typically includes a generally arcuate rod 32 parallel to and spaced apart from at least the end portion 30 of a last thread 28. The arcuate rod 32 is generally semi-circular and extends generally outwardly and axially from the second end 26 and is typically connected to the end portion 30 of a last thread 28 by a plurality of axial rods 34.

The second body 100 includes an annular ridge 102 with a plurality of axial bores 104 extending there through wherein the axial rods 34 of the helical spring 22 are freely axially engaged since the bores 104 are of a diameter generally larger than the diameter of the axial rods 34. At least a portion of the annular ridge 102 forms one or preferably a plurality of abutment protrusions 106. The abutment protrusions 106 extend generally radially outwardly from the second body 100 and are circumferentially spaced apart by the series of axial bores 104. At least one or preferably the series of abutment protrusions 106 of the second body 100 are locatable between the arcuate rod 32 and the end portion 30 of a last thread 28 of the second end 26 of the helical spring 22. A series of preferably semi-circular concave recesses 107 are typically formed on each abutment protrusion 106 to be engageable by the preferably circular circumference of both the arcuate rod 32 and the end portion 30 of a last thread 28. A similar concave recess 107' is typically formed on an adjacent shoulder 106' of the second body 100 to be engageable by the arcuate rod 32. As one skilled in the art will understand the second end 26 of the helical spring 22 is freely anchored to the second body 100 by the possible movement of the second end 26 until the arcuate rod 32 comes into selective abutment contact with either the shoulder 106' or the abutment protrusion 106.

Figure 4A:
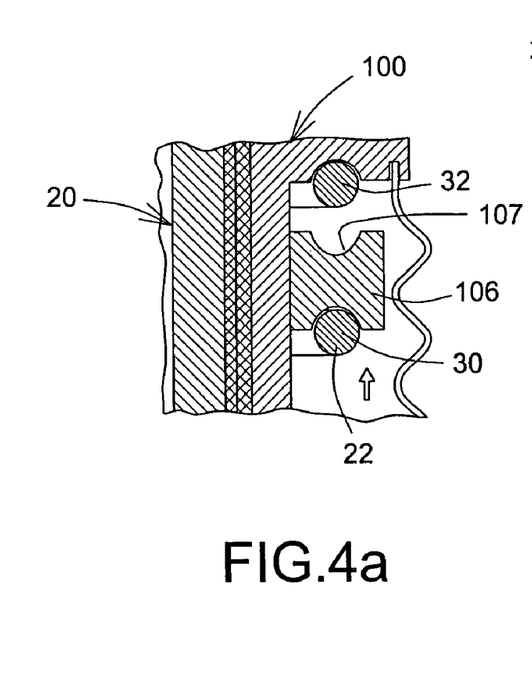
FIG. 4a is an enlarged section view taken along line 4a-4a of FIG. 3a showing the arcuate rod of the end portion of a last thread of the return spring in abutment contact with the second body and the end portion of a last thread of the return spring in abutment contact with the abutment protrusion.
Figure 4B:
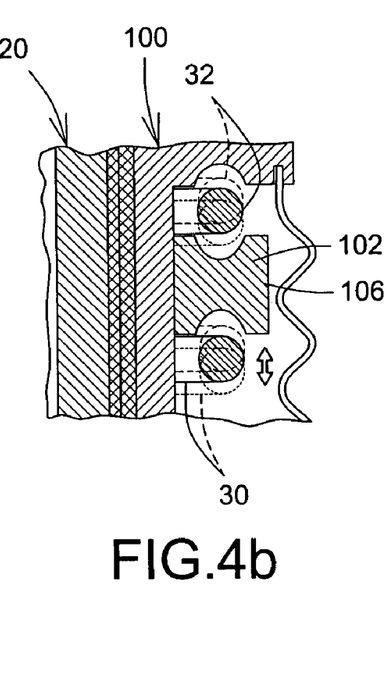
FIG. 4b is an enlarged section view taken along line 4b-4b of FIG. 3b showing the return spring in relation with the abutment protrusion.
Figure 4C:
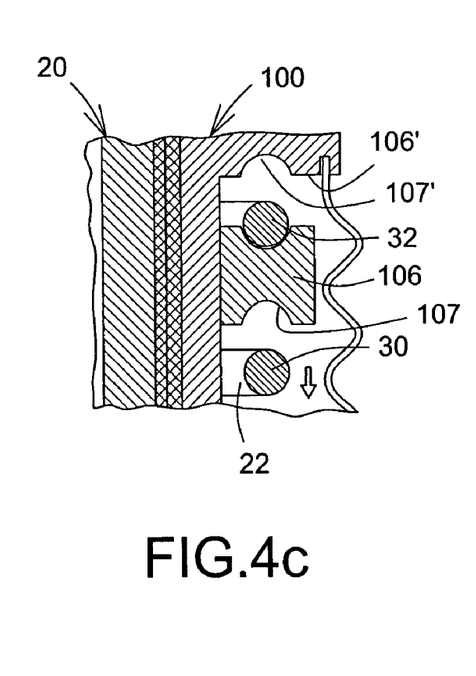
FIG. 4c is an enlarged section view taken along line 4c-4c of FIG. 3c showing the arcuate rod of the return spring in abutment contact with the abutment protrusion.

Those selective abutment contacts are shown more clearly in FIGS. 4a and 4c respectively. In FIG. 4a, it could also be considered that the end portion 30 of a last thread 28 simultaneously comes into selective abutment contact with the abutment protrusion 106. At those times, the second end 26 of the helical spring 22 is outside the predetermined displacement range and in abutment with the second body 100.

When the limits of the predetermined displacement range are not reached, as shown more clearly in FIG. 4b, the second end 26 of the helical spring 22 is free from the second body 100. The dotted lines of the arcuate rod 32 and of the end portion 30 of a last thread 28 of FIG. 4b further represent the displacement thereof within the predetermined displacement range. The position of both the arcuate rod 32 and of the end portion 30 of a last thread 28 shown by the continuous lines in FIG. 4b, relative to the abutment protrusions 106 characterizes the nominal or equilibrium position of the apparatus 10. The equilibrium position is further defined when the first body 20 is substantially half-way within the free zone relative to the second body 100. Since mini-vibrations on the surface of roads are of amplitude of between about 0 mm and about 10 mm (0.4 inch) are found to cover a proportion of generally above 80%, as shown in various studies and well known in the art, the apparatus 10 is manufactured so as to offer a predetermined displacement range or free zone of generally between 0 and 16 mm, and preferably between about 0 and about 10 mm. Considering an average speed of a motor vehicle, the apparatus 10 operates under and maximizes the related high frequencies. Most mini-vibrations considered herein are not usually felt by the occupants of the vehicle in standard conditions.

As shown in FIGS. 1 and 1a, the first body 20 further includes a generally elongated central rod 36 preferably threaded in parts for mechanical assembly purposes. A first end 38 of the rod 36 is secured into the first body 20. The second end 40 of the rod 36 ends in a compensation chamber 108 of the second body 100. The second body 100 further includes an urging means 110 or preferably a 'bumper' compressive spring or the like. The compressive spring 110 is mounted within a cavity 112 connected by an opening 114 of preferably smaller diameter than the cavity 112 to the compensation chamber 108. A stopper 116 is furthermore preferably inserted between the compressive spring 110 and the cavity 112. As one skilled in the art will understand, when the first body 20 is displaced towards the second body 100 further than when the arcuate rod 32 comes in abutment contact with the shoulder 106', thereby outside the predetermined displacement range, the helical spring 22 compresses further, pushing the central rod 36 towards the stopper 116 and the compressive spring 110 of the second body 100. It is noted that assembly of the apparatus 10 ensures that when the apparatus is mounted and calibrated, the contact between the central rod 36 and the stopper 116 does not preferably happens prior to the apparatus being outside the predetermined displacement range.

As the compression of the helical spring 22 progresses further until the first body 20, and the central rod 36, reaches a first displacement limit, the second end 40 of the rod 36 engages the stopper 116 and therefore the compressive spring 110. This activation of the compressive spring 110 induces a further load for a reversal action, added to the load already provided by the compressed helical spring 22, to force away from each other the first body 20 and the second body 100 towards the free zone.

The apparatus 10 further includes a detecting means 120 linked to the urging means 110 or compressive spring and also electrically connectable to a controller C, such as shown in dotted lines in FIG. 1 and preferably linked to an external electrical power source (not shown). The detecting means 120 generally includes a piston 122 or cylinder connected to the stopper 106 and a position sensor 124 or the like. The sensor 124 of the detecting means 120 is connected to a connection box 126 via wiring 125 and further linked to the controller C via wiring 127.

The apparatus 10 further includes a power generating means 180 to be detailed hereinafter and mounted on both first and second bodies 20, 100. The power generator 180 operates and provide electrical power when the first and second body 20 and 100 axially move relative to one another, at least within the predetermined displacement range, but also typically beyond, over the entire possible displacement range between the two bodies 20, 100, or full stroke of the apparatus 10. As one skilled in the art will understand, when the position sensor 124 detects the first body 20 reaching a second displacement limit beyond the first displacement limit thereby signifying operation well outside the predetermined displacement range where both the helical and compressive springs 22, 110 are insufficient to push the two bodies away from each other, the detecting means 120 sends a signal to the controller C to typically allow for a temporary or momentary reverse operation of the power generator 180 in turning the same, by applying tension from an external power source (not shown) thereto, into an electrical urging means, such as an active suspension system (not shown) or the like to enter in operation and temporarily help the springs 22, 110 out as long as the first body is displaced beyond the second displacement limit. Typically, the position sensor 124 is activated via the rod 36 engaging the stopper 116 and the compressive spring 110 when the displacement of the first body 20 towards the second body 100 at the second displacement limit corresponds to the approximately 50% of the travel or stroke of the helical spring 22 of the apparatus 10. When the position sensor 124 detects that the first body moved back within its second displacement limit, the reverse signal is send by the detecting means 120 thereby reversing the operation and re-activating the power generator 180 in it normal mode.

The power generator 180 includes a coil assembly 130 mounted on the second body 100. The coil assembly 130 is generally cylindrical and includes a bore 132 extending generally axially there through. The coil assembly 130 further defines first and second longitudinal ends 134 and 136 and includes a plurality of windings 138 typically radially adjacent to one another to be in a radial superposition configuration, and wherein each winding 138 extends from the first to the second longitudinal ends 134, 136. Furthermore, each winding 138 has a wire terminal 140 at one of the first or second end 134 or 136, preferably closest to the connection box 126. Each winding 138 is thereby connectable to the controller C via the wire terminals 140 and the connection box 126. The wiring 127 includes the wiring 125 from the position sensor 124 and the individual wires (not shown) of the windings 138 from the wire terminal 140. The controller C can electrically interconnect by upfront programming or the like the plurality of windings 138 in a series and/or parallel configuration, or any combination thereof, depending on the condition of use of the apparatus 10 in order to make it as efficient as possible. It should be understood by someone skilled in the art that many connecting configurations are possible, including connecting all the windings 138 in a parallel configuration, or connecting at least two or more windings 138 in a parallel configuration and the remaining windings 138 in a series configuration, or vice-versa, or connecting all the windings 138 in a series configuration. The windings 138 are preferably of a wiring with a thickness of about 0.5 mm and of the rectangular type. Using a plurality of windings 138 with at least some of them in parallel further prevents at least partial failure of the apparatus 10 in the event wherein for example only one winding used or the like is inadvertently severed.

The second body 100 includes a support structure 131 for the coil assembly 130 commonly understood in terms of solenoid block. The support structure 131 includes a generally annular first plate 133 secured within the second body and having a first annular ring 135 to guide the second end 40 of the central rod 36 carrying a first sleeve 41 mounted thereon, a supporting cylinder 137 secured onto the first plate 133 and wherein the windings 138 are wound in a central portion thereof. The supporting cylinder 137 further comprises a wiring cavity 139 in an upper portion 141 thereof to enable insertion of a sheath 143 for protecting the wires of the coil assembly 130. Retaining rings 145, 147 are mounted on the supporting cylinder 137 for keeping the windings 138 in place there between and preferably centrally located along the supporting cylinder 137. A lower portion 149 of the supporting cylinder 137 is secured on a generally annular second plate 151 opposed the first plate 133. The second plate 151 includes a second annular ring 153 to guide the first end 38 of the central rod 36 carrying a second sleeve 39 mounted thereon.

The power generator 180 also includes a magnet assembly 50 mounted on the first body 20. At least a portion 52 of the magnet assembly 50 axially and slidably engages the bore 132 of the coil assembly 130. As one skilled in the art will understand, the power generator 180 of the apparatus 10 is able to operate at least when the first body 20 in within the free zone relative to the second body 100. Furthermore, the limited space between the coil assembly 130 and the bore engaging portion 52 of the magnet assembly 50 defines a first radial air gap 182. The first air gap 182 of the apparatus 10 is generally configured to be the narrowest possible. A first magnet section 54, part of the bore engaging portion 52, of the magnet assembly 50 includes a plurality of magnets 56 generally axially adjacent to one another, each magnet 56 has axially opposed polarities or poles (not shown) and are preferably made out of a neodymium-based type or the like. The plurality of magnets 56 are typically arranged in an alternate magnetic configuration so that each adjacent magnet 56 faces one another with the same magnetic polarity.

A generally cylindrical magnetic component 58 is formed by the plurality of magnets 56. The magnet assembly 50 further includes a cylindrical magnet cover 60 generally radially covering the plurality of magnets 56 and promotes a radial orientation of a magnetic field (not shown) of the first magnet section 54, i.e. substantially perpendicular to the coil assembly 130 for increased efficiency of the power generator 180. The cylindrical magnet cover 60 furthermore acts as a protector of the first magnet section 54 and is preferably made out of carbon steel or the like. The magnet assembly 50 typically mounted on the central rod 36 in-between first and second sleeves 41 and 39 is retained in place preferably by pairs of support or standard lock washers 51, and then by pairs of clamping and lock nuts 53.

The first magnet section 54 further includes a plurality of spacers 62 made preferably of carbon steel each inserted in-between two adjacent magnets 56. This offers a combination of alternating magnets 56 and spacers 62 to substantially and uniformly distribute a magnetic field (not shown) between the two adjacent magnets 56 separated by each spacer 62. The thickness of each spacer 62 is preferably of about 0.35 mm. Other arrangements or combinations of magnets 56 and spacers 62 are possible without departing from the scope of the present invention. For example, each spacer 62 could alternatively be replaced by a magnet 56.

The magnet assembly 50 typically includes a second magnet section 64 extending generally radially outwardly from the coil assembly 130 and movable axially and slidably relative to the coil assembly 130 and defining a second air gap 184 there between at least when the first body 20 moves relative to the second body 100 within the free zone. Alternatively, the second magnet section 64 could be of the same material as the spacers 62 or the like. The thickness of the second magnet section 64 is preferably of about 0.35 mm. The second magnet section 64 includes a magnetically conductive component 66 which augments and concentrate the magnetic field of the first magnet section 54 within a reduced area in a close relationship with the coil assembly 130 at least when the first body 20 is in the free zone, thereby improving the propagation of the magnetic flux there around to increase the electrical power output by the power generator 180. Furthermore, the second magnet section 64 includes a shield 68 that extends generally radially outwardly relative to the magnetically conductive component 66. The shield 68 typically extends axially at least over the coil assembly 130 at least when the first body 20 is in the free zone to protect the power generator 180 from external electromagnetic disturbances such as for example radio waves, high voltage power lines or the like.

The apparatus 10 further includes a linear sliding and guiding means mounted on at least one of the first and second bodies 20, 100. The sliding and guiding means allows axial sliding and preferably contaclessly guides axial sliding of the first body 20 relative to the second body 100 at least when the apparatus 10 is in the free zone. A guiding ring 69 inserted within the first body 20 axially keeps the lower portion 149 of the supporting cylinder 137 of the second body 100 aligned with the first body 20.

The linear sliding and guiding means includes at least one first magnetic piece 70 including preferably a plurality of elongated first magnetic bands 72 secured on the first body 20, and at least one second magnetic piece 142 that typically includes a plurality of elongated second magnetic bands 144 secured onto the second body 100. The first and second magnetic pieces 70, 142 generally radially face one another in a magnetic repulsion configuration, and typically, each first magnetic band 72 generally faces one of the second magnetic bands 144, at least when the apparatus 10 is within the free zone. Preferably, each of the first and second magnetic bands 72 and 144 are generally equally circumferentially spaced apart from one another to cooperate in tandem. Furthermore, the first magnetic bands 72 are preferably either of a concave or convex form whilst the opposite second magnetic bands 144 are of the other form, either convex or concave. The sliding and guiding means also help prevents the overall radial rotation of the first body 20 relative to the second body 100.

Figure 3A:
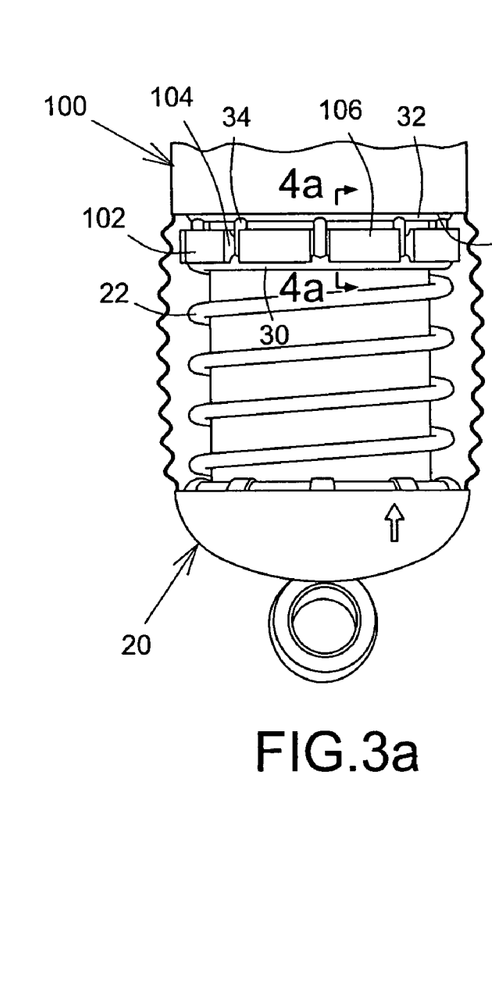
FIG. 3a is a partially front elevation view of the embodiment of FIG. 1 showing the return spring when the first body is moved towards the second body.
Figure 3B:
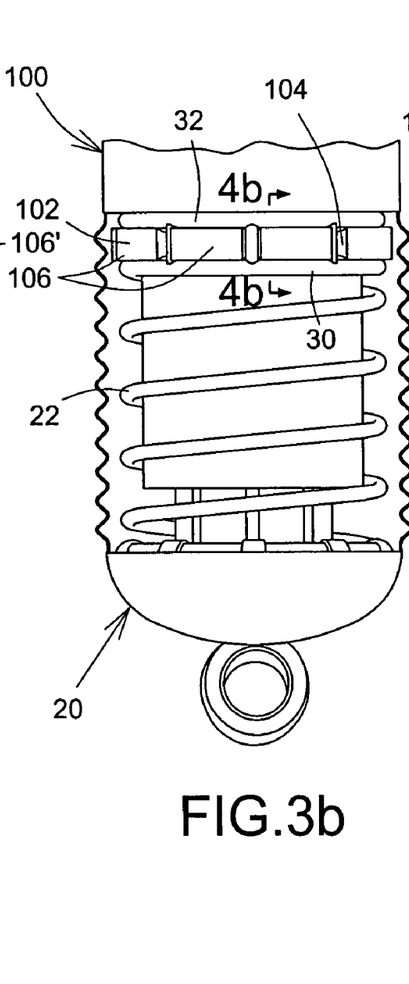
FIG. 3b is a view similar to FIG. 3a, illustrating the return spring within the predetermined displacement range.
Figure 3C:
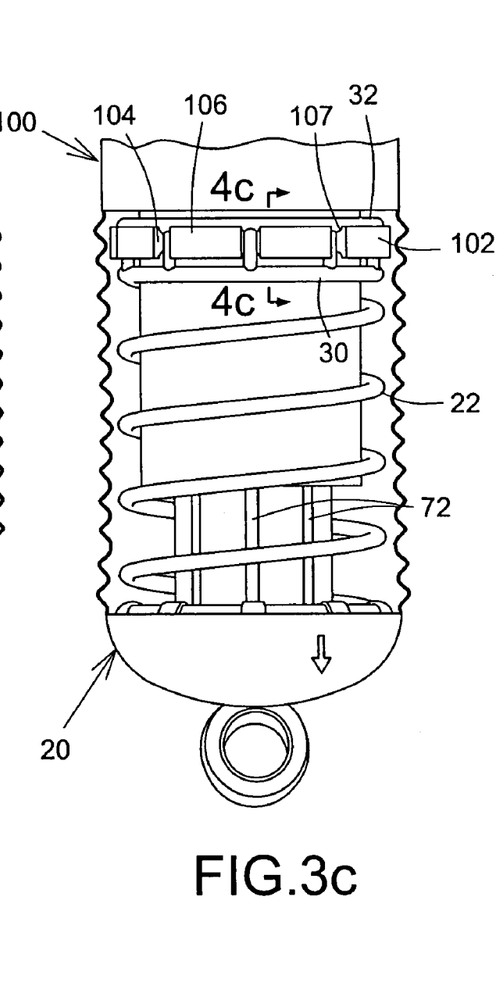
FIG. 3c is a view similar to FIG. 3a, illustrating the return spring when the first body is moved away from the second body.

The apparatus 10 has a hard displacement limiting means mounted on at least one of the first and second body 20, 100 for limiting the axial movement of the two bodies 20, 100 relative to one another. The displacement limiting means includes first and second abutment surfaces 74, 76 mounted on the first body 20 and corresponding third and fourth abutment surfaces 146, 148 mounted on the second body 100. When the apparatus 10 is in a compression configuration (as shown in FIG. 3a), the axial displacement of the first body 20 towards the second body 100 is limited by the first and third abutment surfaces 74 and 146 abutting each other (shown in FIG. 1). In a tension configuration of the apparatus 10 (as shown in FIG. 3c), the axial displacement of the first body 20 away from the second body 100 is limited by the second and fourth abutment surfaces 76 and 148 abutting each other (shown in FIG. 1).

The apparatus 10 includes a variable space 78 adjacent the helical spring 22. The space 78 can change volume depending if the apparatus 10 is in a compression or in a tension configuration for example. The apparatus 10 further includes an enclosing means in relation to both first and second bodies 20 and 100 that forms an enclosure 80 around the space 78. The enclosing means typically includes a bellows 82, typically sealably, connected to both first and second bodies 20, 100 that allows axial displacement of the bodies 20, 100 relative to one another and further essentially separate the space 78 from elements and/or debris (not shown) outside of the apparatus 10.

The compensation chamber 108 briefly described hereinabove is also defined between the first and second bodies 20, 100, generally axially opposite of the enclosure 80 relative to the power generator 180. It is also adjacent the location where the second end 40 of the central rod 36 is, and therefore allows for axial displacement between the first and second bodies 20 and 100 relative to one another. Since the chamber 108 is essentially practically fluidly isolated from the enclosure 80, it includes a flexible membrane 150, preferably sealably connected thereto, that essentially separates a volume 152 within the chamber 108 from the environment (not shown) outside the apparatus 10. The membrane 150 easily radially expands or contracts following the internal pressure variations of the volume 152 and according to the configuration of the apparatus 10 thereby substantially eliminating damping constraints thereto that would inevitably badly affect its performance. Preferably, the first and second bodies 20, 100 include a plurality of pressure equilibrium bores 186 extending there through and allowing partial pressure equilibrium between the enclosure 80 and the chamber 108, thereby forming a fluidly closed room 188 within the apparatus 10.

In an alternative embodiment (not shown) of the apparatus 10, one skilled in the art would understand that the enclosing means could include a single sealed bellows or membrane that would form a fluidly closed room with the first and second bodies 20, 100 adjacent the helical spring without departing from the scope of the present invention. Such a single membrane could either cover both the bellows 82 and the flexible membrane 150 or be the bellows 82 while the compensation chamber would not be 'open' to the outside environment.

Figure 5:
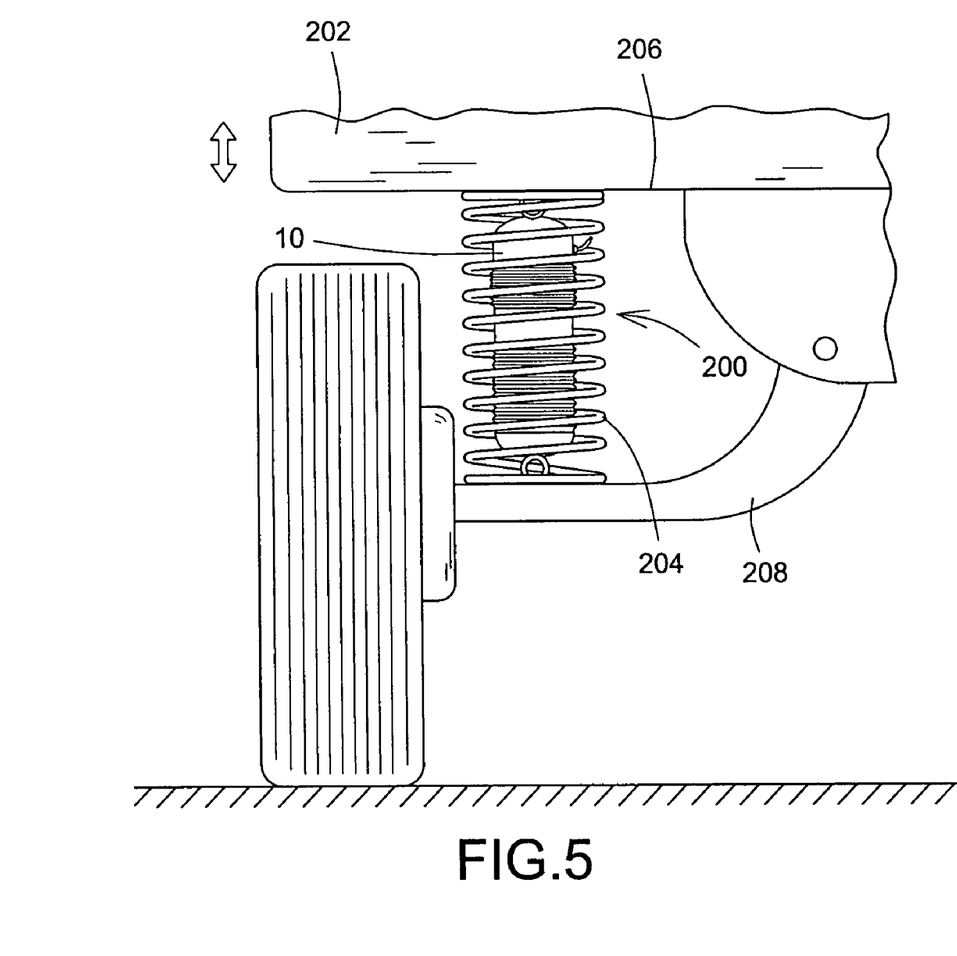
FIG. 5 is front elevation view showing a vehicle suspension system with an apparatus of the embodiment of FIG. 1 mounted in parallel with a suspension coil spring.

A typical use of the apparatus 10 is shown in FIG. 5, wherein a suspension system 200 of a motor vehicle 202 includes a coil spring 204 secured to a body structure 206 of the vehicle 202 and to a wheel mounting structure 208 typically pivotally mounted on the vehicle 202, and an apparatus 10 typically mounted in parallel to the coil spring 204 between the body structure 206 and the wheel mounting structure 208. Therefore, one skilled in the art will understand that the apparatus 10 is preferably mounted on a vehicle 202 alongside with a suspension spring 204 without any typical shock absorber or the like since the apparatus 10 would essentially replaces the shock absorber. At rest, the apparatus 10 would essentially be half-way within the free zone, to take advantage of all the vibrations there about at typically high frequency and low amplitude induced into the suspension system 200 while the apparatus 10 is in its free zone for higher efficiency of the apparatus 10. Outside the free zone, the apparatus 10 would still generate power while starting to act as a damper to the system 200.

Also, the apparatus 10 is preferably used on hybrid or electrical type motor vehicle, but could also be mounted on standard motor vehicles to help generating power that is always welcomed. Furthermore, the apparatus 10 could be mounted on a variety of industrial equipment as long as the equipment provides for the appropriate high frequencies range and low amplitude vibrations necessary for efficient operation of the apparatus 10, thereby generating electrical energy.

Most materials used for the apparatus 10 and not particularly noted hereinabove are standard in the industry. A composite material however preferably forms the structural components of the first and second bodies 20, 100 considering the composite light weight, robustness, fatigue resistance, high thermal resistance and thermal stability with regards to dilatation and contraction. The bellows 82 and the membrane 150 of the apparatus 10 are preferably flexible but also resistant to external stresses of the weather and the likes. Correspondingly, since the apparatus 10 operates in a closed circuit, one skilled in the art will understand that the apparatus 10 is therefore protected from outside elements (not shown) such as dust, rocks, water, ice and other external debris that could potentially damage the operability or reduce significantly the service maintenance of the apparatus 10 while increasing its life duration.

The moving parts of the first body 20 sliding on other parts of the second body 100 for proper operation generally use standard or non-magnetic methods such as roller bearings and the likes, apart for the linear sliding and guiding means using the plurality of first and second magnetic bands 72 and 144 which are using a magnetic floating method (without contact) for reduced wearing and friction. The moving parts using either one of the standard methods or a magnetic method include the sleeves 41 and 39 of the central rod 36 sliding respectively within the annular rings 135 and 153 of the support structure 131, and the lower portion 149 of the supporting cylinder 137 sliding within the guiding ring 69 of the first body 20.

Although the present linear generator apparatus 10 has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A linear generator apparatus, comprising:
    first and second elongate bodies generally coaxial relative to one another, said first and second bodies being generally axially movable relative to one another with a reciprocating movement, said first body being generally axially and freely movable relative to said second body within a predetermined displacement range;
    a means for biasing said first body toward said predetermined displacement range relative to said second body when outside of said predetermined displacement range, said biasing means connecting to both said first and second bodies; and
    a means for generating electrical power mounted on both said first and second bodies, said power generating means generating power when said first and second bodies axially move relative to one another at least within said predetermined displacement range.

2. The apparatus of claim 1, wherein said biasing means has generally opposite first and second longitudinal ends, said first end being fixedly connected to said first body, said second end being releasably connected to said second body.

3. The apparatus of claim 1, wherein said biasing means is a helical spring generally parallel to said first and second bodies, said helical spring has generally opposite first and second longitudinal ends, said first end being fixed to said first body, said second end being freely anchored to said second body.

4. The apparatus of claim 3, wherein said second end is free from said second body when said first body is within said predetermined displacement range and in abutment with said second body when said first body is outside from said predetermined displacement range.

5. The apparatus of claim 4, wherein said second end includes an arcuate rod extending generally outwardly and axially therefrom, said arcuate rod being generally parallel to and spaced apart from at least an end portion of a last thread of said second end.

6. The apparatus of claim 5, wherein said second end includes a plurality of axial rods, said axial rods connecting said arcuate rod to said at least an end portion of a last thread.

7. The apparatus of claim 6, wherein said second body includes at least one abutment protrusion extending generally radially outwardly therefrom, said at least one abutment protrusion being locatable between said arcuate rod and said at least an end portion of a last thread so as to be in selective abutment contact with one of said arcuate rod and said at least an end portion of a last thread when said when said first body is outside from said predetermined displacement range.

8. The apparatus of claim 7, wherein said second body includes a plurality of abutment protrusions extending generally radially outwardly therefrom, said plurality of abutment protrusions being circumferentially spaced apart form one another to freely receive a respective said plurality of axial rods therebetween.

9. The apparatus of claim 7, wherein said at least one abutment protrusion form at least a portion of an annular ridge, said annular ridge having a plurality of axial bores extending therethrough, each of said plurality of axial rods freely axially engaging a respective said plurality of axial bores.

10. The apparatus of claim 9, wherein said arcuate rod is substantially half-circular.

11. The apparatus of claim 1, further including a means for urging said first body away from said second body and toward said predetermined displacement range relative to said second body when said first body reaches a first displacement limit outside of said predetermined displacement range and when said first and second bodies are being displaced toward one another.

12. The apparatus of claim 11, wherein said urging means is a compressive spring mounted on said second body.

13. The apparatus of claim 11, further including a means for detecting operation of said first body reaching a second displacement limit outside of said predetermined displacement range and beyond said first displacement unit, said detecting means being electrically connectable to a controller linked to an external electrical power source, said detecting means providing signal to the controller for allowing reverse operation of said power generating means into an electrical urging means during displacement of said first body beyond said second displacement limit so as to assist said urging means and said biasing means to displace said first and second bodies away from one another toward said predetermined displacement range.

14. The apparatus of claim 13, wherein said power generating means includes a magnet assembly mounted on said first body and a coil assembly mounted on said second body, said magnet assembly being operatively coupled to said coil assembly at least when said first body is within said predetermined displacement range relative to said second body.

15. The apparatus of claim 14, wherein said coil assembly has a generally cylindrical shape with a bore extending generally axially therethrough, at least a portion of said magnet assembly axially and slidably engaging said bore and defining a radial air gap therebetween with said coil assembly when said first body is within said predetermined displacement range relative to said second body.

16. The apparatus of claim 15, wherein said coil assembly defines first and second longitudinal ends thereof and includes a plurality of windings, each said windings extending generally axially between said first and second coil ends, each said windings having wire terminals coming out at one of said coil ends.

17. The apparatus of claim 16, wherein said plurality of windings are generally radially adjacent to one another in a radial superposition configuration.

18. The apparatus of claim 1, wherein said predetermined displacement range is about one centimeter (0.4 inch).

19. The apparatus of claim 17, wherein said plurality of windings are individually electrically connectable to the controller so as to allow the controller selectively electrically interconnect said plurality of windings in a series and/or parallel configuration depending on a condition of use of said apparatus.

20. The apparatus of claim 15, wherein said at least a portion of said magnet assembly is a first section thereof, said first magnet section includes a plurality of magnets generally axially adjacent to one another.

21. The apparatus of claim 20, wherein each said magnets has axially opposed magnetic polarities, said plurality of magnets being arranged with an alternate magnetic configuration such that adjacent said magnets face one another with a same magnetic polarity.

22. The apparatus of claim 21, wherein each said plurality of magnets form a generally cylindrical magnetic component, said magnet assembly including a cylindrical magnet cover, said magnet cover generally radially covering said plurality of magnets and favoring a substantially radial orientation of a magnetic field of said first magnet section.

23. The apparatus of claim 22, wherein said first magnet section includes a plurality of spacers between adjacent said magnets so as to provide an alternating magnet-spacer configuration of said first magnet section, each said spacer substantially uniformly distributing a magnetic field between respective adjacent said magnets.

24. The apparatus of claim 20, wherein said air gap is a first air gap and said magnet assembly includes a second section thereof, said second magnet section extending generally radially outwardly from said coil assembly to axially and slidably move relative thereto and define a second radial air gap therebetween with said coil assembly when said first body is within said predetermined displacement range relative to said second body.

25. The apparatus of claim 24, wherein said second magnet section includes a magnetically conductive component, said magnetically conductive component confining a magnetic field of said first magnet section in a close relationship relative to said coil assembly when said first body is within said predetermined displacement range relative to said second body so as to locally enhance propagation of the magnetic field and increase electrical power generated by said power generating means.

26. The apparatus of claim 25, wherein said second magnet section includes a shield extending radially outwardly relative to said magnetically conductive component, said shield extending axially at least over said coil assembly when said first body is within said predetermined displacement range relative to said second body so as to at least shield said power generating means from external electromagnetic disturbances.

27. The apparatus of claim 1, further including a means for guiding and allowing axial sliding of said first body relative to said second body at least when said first body is within said predetermined displacement range relative to said second body, said linear sliding and guiding means mounting at least on one of said first and second bodies.

28. The apparatus of claim 27, wherein said linear sliding and guiding means contactlessly guides axial sliding of said first body relative to said second body at least when said first body is within said predetermined displacement range relative to said second body.

29. The apparatus of claim 28, wherein said linear sliding and guiding means includes at least one first magnetic piece mounted on said first body and at least one second magnetic piece mounted on said second body, said first and second magnetic pieces generally radially facing one another in a magnetic repulsion configuration at least when said first body is within said predetermined displacement range relative to said second body.

30. The apparatus of claim 29, wherein said at least one first magnetic piece includes a plurality of elongate first magnetic bands and said at least one second magnetic piece includes a plurality of elongate second magnetic bands, each said first magnetic bands generally facing a respective one of said second magnetic bands at least when said first body is within said predetermined displacement range relative to said second body.

31. The apparatus of claim 30, wherein one of said first and second magnetic bands have a generally concave facing surface and the other one of said first and second magnetic bands have a generally convex facing surface.

32. The apparatus of claim 31, wherein said first magnetic bands are generally equally circumferentially spaced apart from one another and said second magnetic bands are generally equally circumferentially spaced apart from one another so as to allow each said first magnetic bands operatively coupling to a respective said second magnetic bands.

33. The apparatus of claim 1, further including a means for limiting axial displacement of said first and second bodies relative to one another, said displacement limiting means mounting on at least one of said first and second bodies.

34. The apparatus of claim 33, wherein said displacement limiting means first and second abutment surfaces of said first body and third and fourth abutment surfaces of said second body, said first and third abutment surfaces limiting axial displacement of said first body toward said second body when said apparatus is in a compression configuration, said second and fourth abutment surfaces limiting axial displacement of said first body away from said second body when said apparatus is in a tension configuration.

35. The apparatus of claim 1, wherein said first and second bodies are axially spaced apart from one another by a variable space at a location substantially adjacent said biasing means, said apparatus further including a means for enclosing said variable space, said enclosing means connecting to both said first and second bodies and forming an enclosure of said variable space therewith.

36. The apparatus of claim 35, wherein said enclosing means includes a bellows so as to allow axial displacement of said first and second bodies relative to one another.

37. The apparatus of claim 36, wherein said first and second bodies define a chamber therebetween, said chamber being generally axially opposite from said enclosure relative to said power generating means, said chamber allowing for relative axial displacement of said first and second bodies.

38. The apparatus of claim 37, wherein said chamber is essentially fluidly isolated from said enclosure, said apparatus further including a generally flexible membrane at least partially defining said chamber so as to allow substantially radial expansion and contraction of a volume of said chamber caused by internal pressure variations therein due to relative axial displacement between said first and second bodies.

39. The apparatus of claim 38, wherein said membrane and bellows are sealably connected to said first and second bodies to form a fluidly closed room inside said apparatus, said first and second bodies including a plurality of pressure equilibrium bores extending therethrough to allow for at least partial pressure equilibrium between said chamber and said enclosure of said closed room.

40. The apparatus of claim 35, wherein said enclosing means is sealably connected to said first and second bodies to form a fluidly closed room inside said apparatus, said closed room including said variable space, said first and second bodies including a plurality of pressure equilibrium bores extending therethrough to allow for at least partial pressure equilibrium within said closed room.

41. A suspension system for a motor vehicle, comprising:
a coil spring connected to a body structure of the motor vehicle and to a wheel mounting structure pivotally mounted on the body structure;
a linear generator apparatus mounted on the motor vehicle between the body structure and the wheel mounting structure, said apparatus including:
   first and second elongate bodies generally coaxial relative to one another, said first and second bodies being generally axially movable relative to one another with a reciprocating movement, said first body being generally axially and freely movable relative to said second body within a predetermined displacement range;
   a means for biasing said first body toward said predetermined displacement range relative to said second body when outside of said predetermined displacement range, said biasing means connecting to both said first and second bodies; and
   a means for generating electrical power mounted on both said first and second bodies, said power generating means generating power when said first and second bodies axially move relative to one another at least within said predetermined displacement range.

42. The suspension system of claim 41, wherein said apparatus is mounted in parallel relative to said coil spring.

43. The suspension system of claim 42, wherein said first body is displaced substantially halfway within said predetermined displacement range relative to said second body when said suspension is in an equilibrium position.

* * * * *